Figure 1:
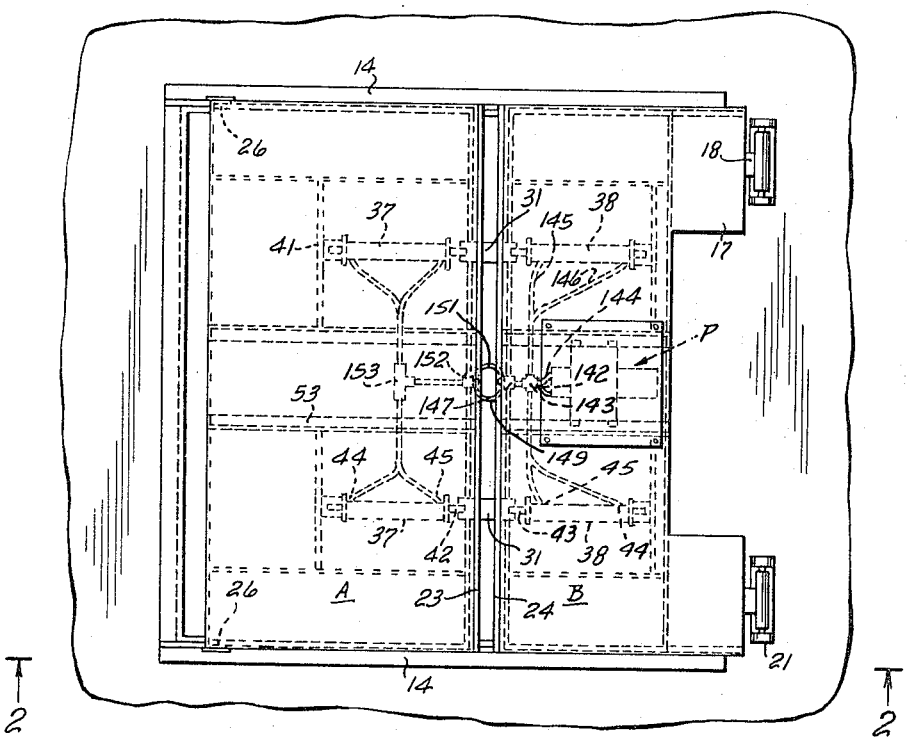

March 28, 1967 P. RICHTER 3,310,913
HYDRAULICALLY OPERATED HATCH COVER
Filed May 11, 1965 5 Sheets-Sheet 1

INVENTOR
PHILIP RICHTER
BY
Arthur R Colvin
ATTORNEY

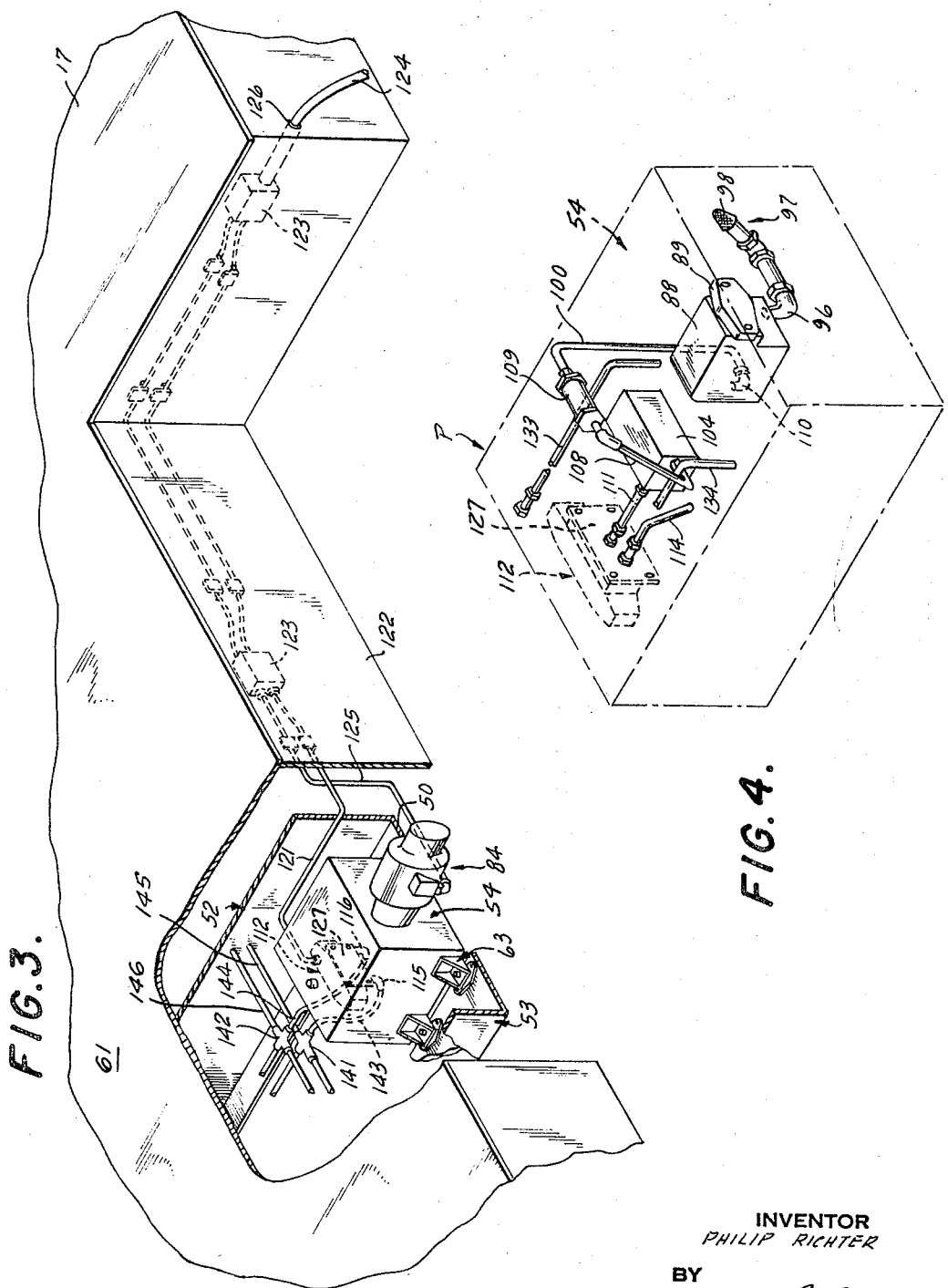

March 28, 1967 P. RICHTER 3,310,913
HYDRAULICALLY OPERATED HATCH COVER
Filed May 11, 1965 5 Sheets-Sheet 3

INVENTOR
PHILIP RICHTER
BY Arthur B. Colin
ATTORNEY

March 28, 1967 P. RICHTER 3,310,913
HYDRAULICALLY OPERATED HATCH COVER
Filed May 11, 1965 5 Sheets-Sheet 4

INVENTOR
PHILIP RICHTER
BY
Archer B Colvin
ATTORNEY

INVENTOR
PHILIP RICHTER
BY
Arthur B. Colvin
ATTORNEY

United States Patent Office 3,310,913
Patented Mar. 28, 1967

3,310,913
HYDRAULICALLY OPERATED HATCH COVER
Philip Richter, Bethlehem, Pa., assignor to Fuller
Company, a corporation of Delaware
Filed May 11, 1965, Ser. No. 454,788
7 Claims. (Cl. 49—340)

This invention relates to the art of hatch covers, more particularly of the hydraulically operated type.

This application is a continuation-in-part of copending application Ser. No. 279,374, filed May 10, 1963, now abandoned.

As conducive to an understanding of the invention, it is noted that where a ship has a number of hatchways, each provided with an associated hydraulically operated hatch cover assembly of the type shown, for example, in Reissue Patent No. 24,238, and a central power source located at some remote position is utilized to operate all of the individual hatch cover assemblies to effect movement thereof between closed and open position, with respect to the hatchway, due to the large power requirement that would be needed to operate all of the hatch cover assemblies simultaneously, which would be impracticable, the conventional hydraulic system normally is designed to operate only one or two hatch cover assemblies at a time. Therefore, care need be exercised during operation so that no attempt is made to operate more than a specified number of hatch cover assemblies simultaneously, less there be insufficient fluid flow properly to actuate any of the covers. Moreover, since the assemblies are individually operated in sequence, actuation of a plurality of hatch cover assemblies is time consuming in comparison to a system in which all hatch cover assemblies would be actuated simultaneously.

Furthermore, where a central power source is utilized, a complex piping system would be required leading from the fluid supply at the power source to each of the hydraulic actuators associated with each of the hatch cover assemblies. Such complex piping system would necessarily involve a multiplicity of lines, fittings and couplings subject to vibration and hence to leakage, which could have serious consequences where the hydraulic fluid leaked onto cargo, causing damage thereto.

In addition, during the assembly of such a central system, since the piping would have to be first installed by the ship builders and subsequently connected to the power source and to the hatch cover piping leading to the hydraulic actuators carried by the hatch cover assemblies, contamination would inevitably occur due to the entry of foreign bodies such as metal, dust, paint and the like, normally present during the construction of a ship, into the fluid lines before connection thereof to form a sealed system.

Contamination could cause blocking of the fluid passages and necessitate disassembly of the system for removal of the foreign matter. Moreover, such foreign bodies might have harmful effect on the hydraulic actuators, valving and pump and might necessitate replacement of components. In any case, disassembly for cleaning or repair would render the equipment inoperative with resultant delay in ship operations.

Where, to avoid the need of a central power source and the associated complex piping system with their attendant difficulties, individual elements of a power source such as a fluid reservoir, a motor, a pump, filter, control valves and the like, are each rigidly connected to one of the hatch cover panels of each hatch cover assembly, due to the fact that the hatch covers are subjected to considerable impact with resultant vibration and shock and particularly covers which are loaded with cargo thereon after the cover is closed, such vibration and shock may cause damage to the elements of the power source and also may cause loosening of the fittings interconnecting the elements of the power source. As a result of such vibration and shock to the components of the system, the latter would quickly become damaged causing malfunctioning and possible complete lack of functioning of the hatch cover assembly.

It is accordingly among the objects of the invention to provide a hydraulically operated hatch cover assembly of minimum weight commensurate with required cargo loading, having a self-contained power unit which is readily accessible for maintenance and replacement in all positions of the hatch covers, which provides access to the components thereof without removal of oil and which requires the connection thereto of only an electrical power source and an electrical control line to suitable switches to effect opening and closing of the assembly when it is installed, which power unit is so arranged and so mounted in the hatch cover assembly that the component elements of the power unit are substantially isolated from any shock or impact to which the hatch cover panel on which the power unit is mounted may be subjected in normal use of the hatch cover assembly, thereby providing long life and preventing derangement of the equipment and in which many of the components of the power unit are contained within the fluid reservoir of the power unit which reduces the hydraulic piping required and minimizes potential leakage which would damage cargo.

According to the invention, these objects are accomplished by the arrangement and combination of elements hereinafter described and more fully recited in the claims.

Figure 2:
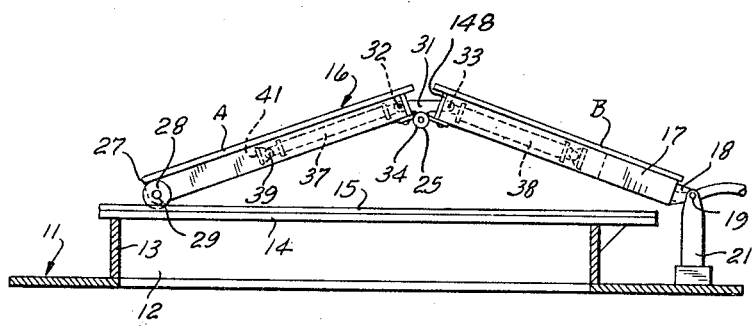
Figure 5:
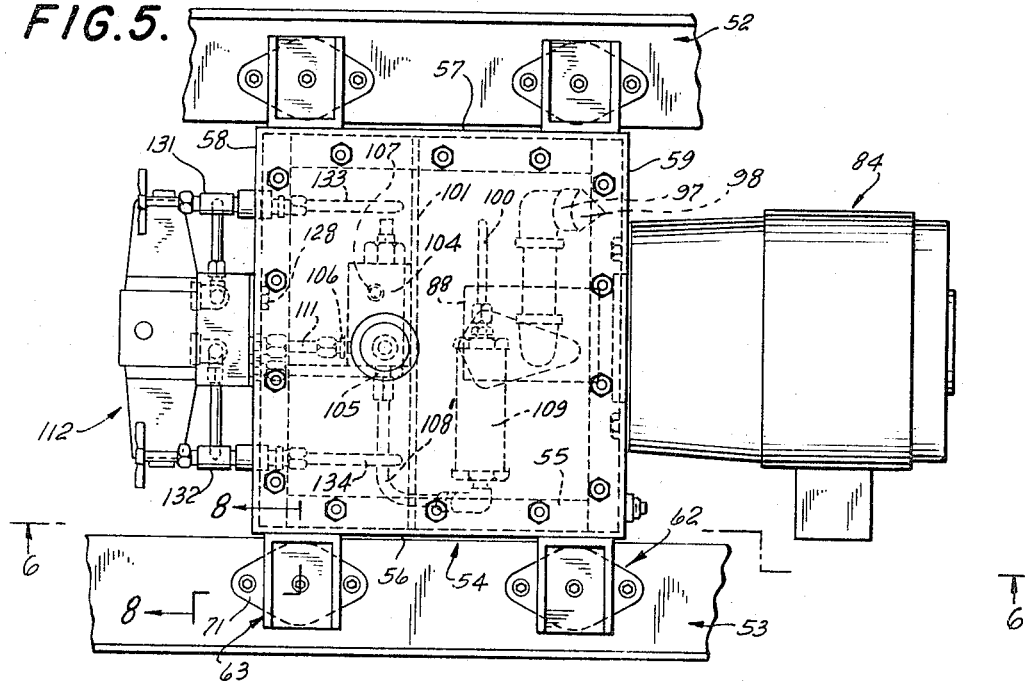
Figure 6:
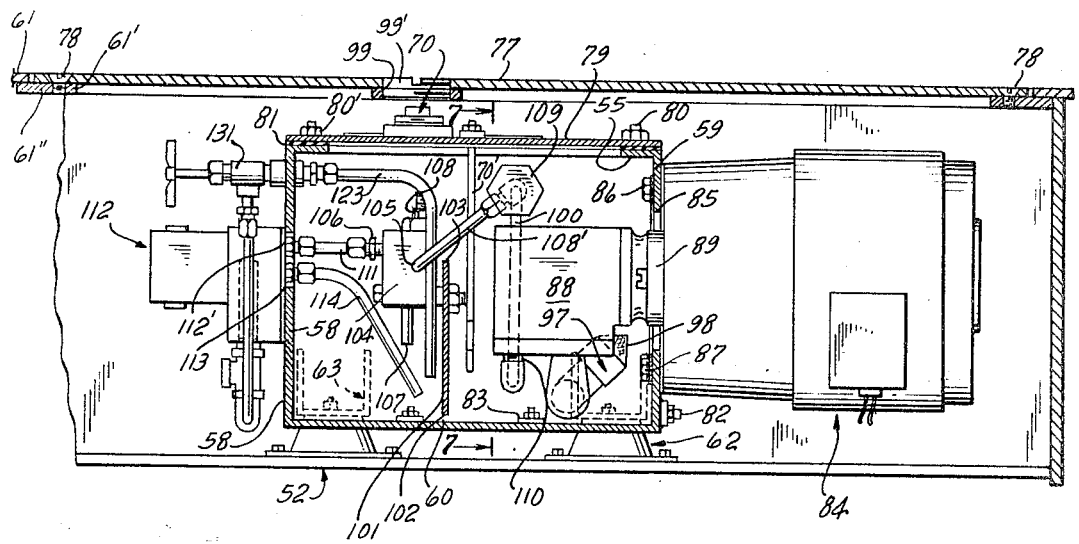
Figure 7:
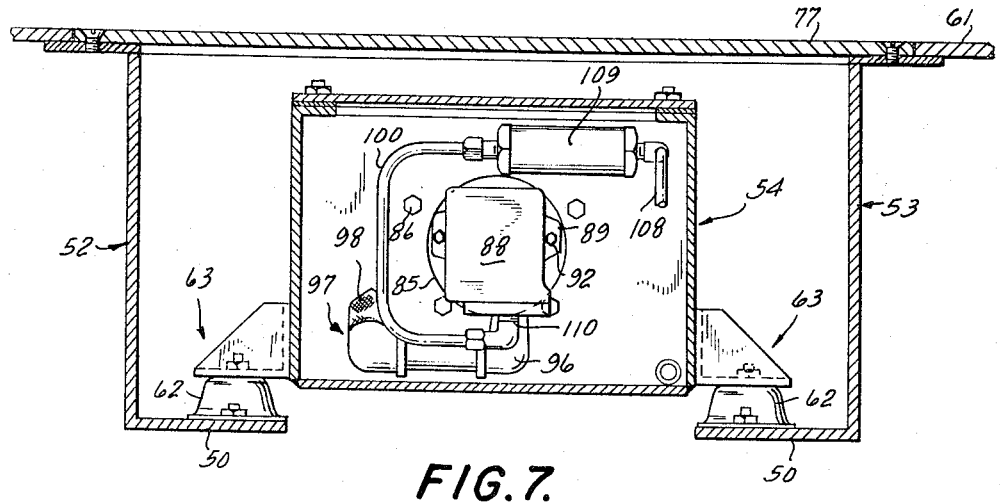
Figure 8:
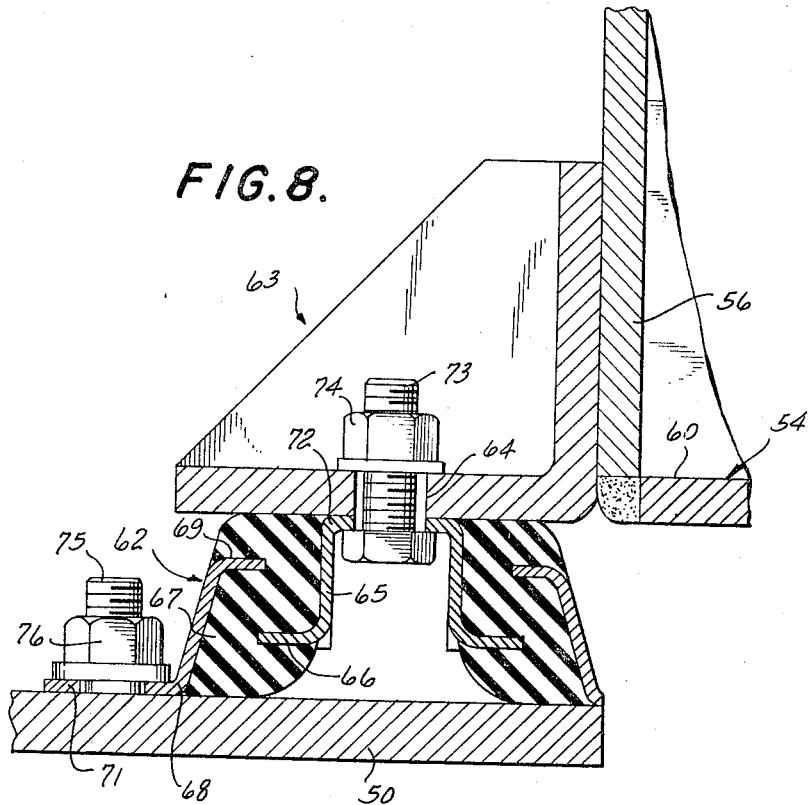
Figure 9:
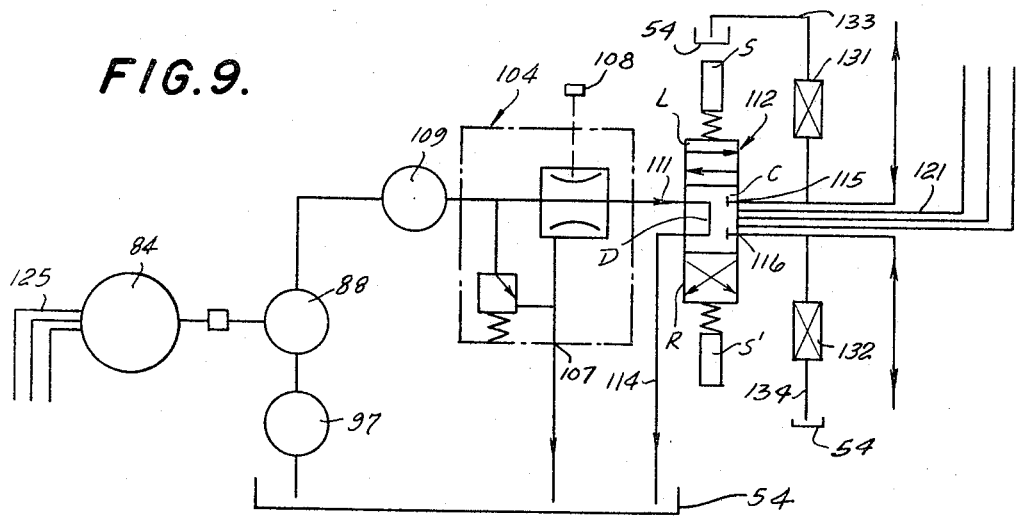
Figure 10:
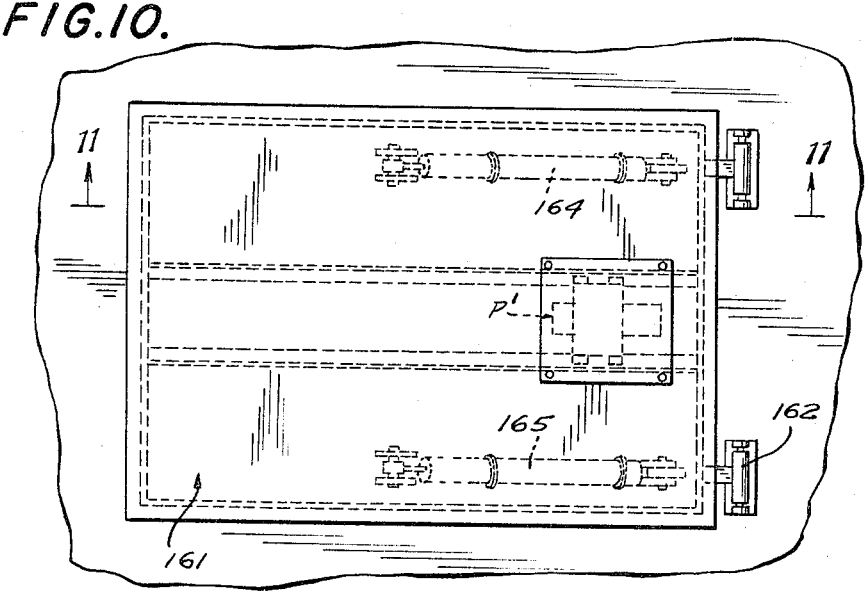
Figure 11:
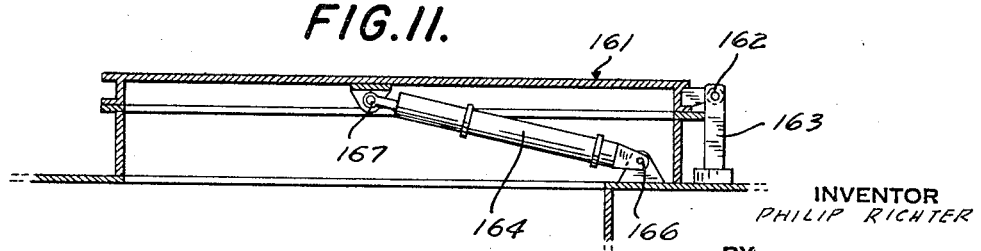

In the accompanying drawings in which are shown one or more of various possible embodiments of the several features of the invention, FIG. 1 is a plan view of a hatch cover assembly according to the invention, FIG. 2 is a side elevational view thereof taken substantially along line 2—2 of FIG. 1, but partly in cross section, FIG. 3 is a fragmentary diagrammatic perspective view on a greatly enlarged scale of one of the hatch cover panels showing the power unit mounted therein, FIG. 4 is a diagrammatic perspective view of the power unit itself, FIG. 5 is a top plan view of the power unit, FIG. 6 is a view taken along line 6—6 of FIG. 5, FIG. 7 is a view taken along line 7—7 of FIG. 6, FIG. 8 is a detail view taken along line 8—8 of FIG. 5 on a greatly enlarged scale showing one of the shock mounts for the power unit, FIG. 9 is a schematic view illustrating the hydraulic system, FIG. 10 is a top plan view showing the invention incorporated in a hatch cover assembly using a single panel, and FIG. 11 is a sectional view taken along line 11—11 of FIG. 10.

Referring now to the drawings, in the illustrative embodiment shown, the deck 11 of the ship has a substantially rectangular opening therein defining a hatchway 12 with a substantially rectangular coaming 13 around such opening 12 rising from the deck 11 of the ship. A ledge 14 extends the length of the hatchway on each side thereof adjacent its upper edge and supports tracks 15 for the hatch cover assembly 16.

The hatch cover assembly 16 illustratively comprises a pair of substantially rectangular panels A and B. The panels are of sufficient length so that they may extend transversely across the hatchway and are of such width that when in closed position they will extend from substantially one end of the opening 12 to the other as is clearly shown in FIGS. 1 and 2 to close the hatchway.

As is clearly shown in FIGS. 1, 2 and 3, the panel B at each end has an outwardly extending portion 17 which illustratively is an integral part of the panel. Each of the portions 17 has secured thereto an arm 18 which extends outwardly from the associated portion 17. The free end of each of the arms 18 is pivotally connected as at 19 to the top of an associated upright standard 21 affixed to the deck 11.

The adjacent inner edges 23, 24 of the panels A and B at their lower edges, are connected as by means of common hinges 25 so that the pair of panels A and B may be folded about such hinges 25 respectively from closed position in which the panels extend horizontally over the hatchway to open position in which the panels are in side by side vertical position at one end of the hatchway.

To facilitate movement of the panels from closed to open position and vice versa, in the manner hereinafter to be described, the panel A at each end 26 adjacent its outer edge 27 mounts a flanged roller 28 rotatably mounted on a shaft 29, the rollers 28 being adapted to ride along the track 15 on the ledges 14.

The panels are desirably moved from closed to open position and vice versa, by hydraulic actuators, illustratively of the type shown in Reissue Patent No. 24,238, dated Nov. 13, 1956.

To this end, referring to FIG. 2, for example, a plurality of reaction members are provided, each preferably comprising a plate 31 which may be substantially triangular in shape having openings 32, 33 and 34 adjacent each of its corners and desirably positioned in a vertical plane with a pin, which defines the axis of hinge 25, extending freely through the bottom opening 34.

Reacting against each of the plates 31 is a pair of opposed hydraulic units 37 and 38 mounted respectively in the panels A and B. The rear ends of each of the units 37, 38 is preferably pivotally mounted as at 39 to an associated beam 41. The outer ends of the reciprocable plungers 42, 43 of the units 37, 38 respectively, are pivotally connected to an associated reaction plate 31 by means of pins extending through the outer ends of the plungers and the openings 32, 33 respectively. The hydraulic units 37, 38 are illustrative of the double acting type and each has a control port 44, 45 at its respective ends on each side of the piston (not shown) slidably mounted therein.

According to the invention, a power unit P is mounted in one of the panels, illustratively panel B, and provides the required energy to actuate the hydraulic units 37, 38.

As is clearly shown in FIGS. 1 and 3, the power unit P illustratively is mounted between the transverse supporting beams 52, 53 of the panel B.

The power unit P comprises a rigid container or casing 54 substantially cubical as shown and which may be formed from separate welded plates or as an integral casting, said casing forming a fluid reservoir.

The casing 54 which has an inwardly extending peripheral rim 55 at its top defining a rectangular opening, and side walls 56, 57, 58 and 59 and a floor 60 is supported on beams 52, 53 of panel B by means of a plurality of resilient shock mounts 62 as is clearly shown in FIG. 5 and FIG. 8, for example.

To this end, the casing 54 illustratively has outwardly extending mounting brackets 63 rigid therewith, a pair of said brackets extending outwardly from each side wall 56, 57 near the floor 60 at each corner thereof, each mounting bracket having an opening 64 in the horizontal leg thereof. The shock mount 62 may be of any conventional type, suitable for taking the multiple directional forces to which they will be subjected in supporting the casing during operation of the hatch cover assembly. The shock mount 62, as shown in FIG. 8, illustratively has a central cup-shaped core 65 with outwardly extending flanges 66 embedded in a resilient annulus 67. Encompassing the annulus 67 is a cup-shaped rigid retaining member 68 with an inwardly extending flange 69 embedded in the resilient annulus 67 and also with an outstanding flange 71 at the lower edge of the shock mount. The cross piece 72 of the hub 65 has a central opening through which a bolt 73 may be inserted so that it will extend through the opening 64 in the associated mounting bracket 63, a nut 74 being screwed on the extending end of the bolt 73 rigidly to secure the shock mount to the bracket 63. The shock mounts 62 are secured to the horizontal ledges 50 of each of the beams 52, 53 by means of weld studs 75 rigid with the ledges 50 and which extend through associated openings in the flanges 71, said studs being externally threaded to receive a complementary nut 76 securely to clamp the shock mounts to the beams 52, 53 of panel B.

The rectangular opening defined by the peripheral rim 55 of the casing 54 is closed by a cover plate 79 which has a plurality of peripheral openings through which extend threaded studs 80 rising from rim 55. Suitable nuts 80' coact with the studs 80 releasably to retain the cover plate in fixed position, a gasket 81 intervening between the cover plate and the rim 55 to provide a seal.

The cover plate 79 has a filling port closed by a plug 70 screwed therein and a threaded opening is provided to receive the threaded plug at the end of a dip stick 70'.

A rectangular access port 61' of dimensions larger than those of the projected dimensions of the power unit P is provided in the top plate 61 of panel B. The port 61' is closed by means of a removable plate 77 retained in position by flush screws 78 on supporting strips 61" which define the port 61'.

The side walls 59 of the casing 54 at its lower end desirably has a removable drain plug 82 to permit emptying of the casing 54 of oil and a plurality of bar magnets 83 are secured to the floor 60 of the casing to collect metal particles or other foreign bodies of magnetic material that might enter into the casing 54.

The power unit P which is of vertical dimension such that it is wholly within the confines of the panel structure, comprises an electric motor 84 which is secured to the side wall 59 of the casing 54. To this end, the side wall 59 has an opening 85 (FIG. 6) with which the motor 84 is axially aligned and a plurality of circumferentially spaced bolts 86 extend through the side wall 59 adjacent opening 85 and are screwed into the body of the motor rigidly to clamp the latter against the outer surface of side wall 59, a gasket 87 being provided between the motor and the side wall 59 through which the bolts 86 extend to provide a dependable liquid seal.

The shaft (not shown) of motor 84, which extends into the casing 54, is operatively connected to the shaft (not shown) of a fluid pump 88 positioned in the casing 54. As is clearly shown in the drawings, the fluid pump 88 has a mounting flange 89 at the end of the pump adjacent the inner surface of wall 59.

The pump 88, preferably a constant volume pump of conventional type, is secured to the motor 84 by means of bolts 92 which extend through respective openings in the flange 89 into threaded openings (not shown) in the associated end of the motor, a suitable gasket being provided between the flange 89 and the motor 84 to provide a dependable fluid seal.

The fluid pump 88 has an inlet port on its undersurface (FIG. 7) connected by suitable piping 96 to a strainer member 97 which illustratively extends in the casing 54 beneath the pump 88, the free end 98 of the strainer illustratively defining the inlet thereto and hence the inlet for the fluid in the reservoir casing 54 to the pump 88.

It is of course to be understood that any suitable type of fluid strainer could be used.

As is clearly shown in FIGS. 5 and 6, a baffle plate 101 extends transversely across the casing 54, illustratively being secured to the opposed walls 56, 57 thereof. The baffle plate 101 illustratively has its lower edge 102 slightly spaced from the floor 60 of the casing 54 and its upper edge 103 considerably spaced from the cover plate 79 of the casing 54. The function of said baffle plate is to deter the hydraulic fluid being returned to the casing, from directly entering the inlet of the pump and to prevent turbulence in the fluid in the container, in the manner to be described. Consequently, any sediment and air in the returned fluid will have a chance to settle out or escape before the returned fluid reaches the pump inlet.

As is clearly shown in FIGS. 5 and 6, the pump 88 and strainer 97 are positioned on one side of the baffle plate 101 and a flow regulator valve assembly 104 is positioned on the other side of the baffle plate. Valve assembly 104 is of conventional type providing a constant flow of fluid for a given setting, irrespective of the resistance in the system. Use of valve 104 provides for actuation of the hydraulic actuators at a controlled uniform rate determined by the setting of the valve assembly with resultant smooth movement of the hatch covers. More specifically, valve assembly 104 has an inlet port 105, an outlet port 106 and a bypass port 107, a screw 108 extending from the upper surface of the regulator valve 104 to permit adjustment of the rate of flow from the outlet port 106, and being aligned with the filling port closed by plug 70. An opening 99 is provided in plate 77 aligned with plug 70 and closed by a threaded plug 99'. The inlet port 105 of the regulator valve 104 is connected by a suitable conduit 108', which extends over the baffle plate 101 to one end of a fluid filter 109 positioned over the pump 88, the other end of the filter being connected by conduit 100 to the outlet port 110 at the undersurface of pump 88.

The pressure outlet port 106 of the regulator valve 104 is connected by conduit 111 through an opening 112' in side wall 58 of the casing 54 to an electric solenoid operated control valve 112, a second opening 113 being provided in wall 58 through which a discharge pipe 114 from the valve 112 extends, for return of fluid into the casing 54.

The solenoid valve 112 may be of any conventional type and preferably is a three-position four-way valve of the type put out by the Double A Products Company of Manchester, Michigan under model No. 10-09951-18B. As shown in FIG. 9, the valve has a neutral or unactuated position and two actuated positions. Normally, the valve is spring biased to the neutral position C diagrammatically shown in FIG. 9 in which the fluid from pump 88 is bypassed through the valve 112 at D back to the reservoir casing 54. Thus, in the neutral position, valve 112 connects line 111 from valve assembly 104 to the return pipe 114 so that should the pump 88 be operating, fluid from pump 88 will be discharged back into casing 54 and due to the fact that there is little resistance, the pump will be operating under relatively little load. In addition, by having a neutral position in which no fluid can flow into or out of the ports 44, 45 of the actuators, valve 112 in such neutral position will hydraulically lock the hatch covers in the particular position in which the operator has stopped their movement.

Solenoids S and S' are used to actuate valve 112 to its respective actuated positions. In one actuated position L of the valve 112, the fluid under pressure from pump 88 and conduit 111 will be connected to fluid port 115 of the valve and the fluid port 116 of the valve 112 will be connected to the reservoir casing 54 through pipe 114.

In another actuated position R of the valve 112, the fluid under pressure from pump 88 will be connected to fluid port 116 and the fluid port 115 will be connected to the reservoir casing 54 through pipe 114.

The solenoids S and S' at each end of the valve are controlled by means of an electric lead 121 which extends along the depending side plates 122 of the panel B through junction boxes 123. The electric leads 125 providing power to the motor 84 also extends along the depending side plates 122 through such junction boxes 123, a common conduit 124 containing the electric leads for the motor and the valve extending through an opening 126 in the end of one of the extending portions 17 of panel B, such conduit 124 being positioned adjacent the upright standards 21 and being connected to a suitable control panel (not shown).

The valve 112, as shown in the drawings, has a mounting surface 127 which is secured to the outer surface of side wall 58 of the casing 54 by bolts 128, a suitable gasket being positioned between the surface 127 and the wall 58.

If the entire electrical system should fail, a bypass is provided in the form of valves 131, 132 which connect the ports 115, 116 of valve 112 through pipes 133, 134 to the casing 54. Thus, in the event of power failure, the valves 131, 132 are opened so that both ends of the hydraulic actuators are in communication with the reservoir. Thereupon, the hatch cover panels may be moved, for example, by cables connected to the ship's gear.

As shown in the drawings, the fluid ports 115 and 116 of the valve 112 are connected to the hydraulic actuators 37, 38.

To this end, a pair of vertically aligned four-way fittings 141, 142 are provided. The ports 115, 116 of valve 112 are connected by flexible hydraulic tubing 143, 144 respectively to fittings 141, 142 and such fittings are connected respectively by lines 145, 146 to the ports 45, 44 of actuators 38 of panel B. The fittings 141, 142 are also connected respectively to a pair of associated fittings 147 mounted on the skirt plate 148 of panel B, said fittings 147 being connected by flexible hydraulic tubing 149, 151 to a corresponding pair of fittings 152 mounted on the skirt plate of panel A. Desirably, the tubing 149, 151 are connected to the fittings 147, 152 through conventional pressure balanced swivel fittings to prevent twisting of the high pressure flexible tubing. The fittings 152 are connected to a pair of T-fittings 153 in panel A and such fittings are connected to the ports 44, 45 of actuators 37 of panel A.

Although the illustrative embodiment of the invention is shown applied to a hatch cover assembly having two pivotally connected panels, it is within the scope of the invention to utilize the power unit on a hatchway covered by an assembly having any number of panels.

Thus, as shown in FIGS. 10 and 11, a hatchway covered by a single panel is shown. The panel 161 is pivotally mounted as at 162 to a standard 163 secured to the deck of the ship. Hydraulic actuators 164, 165 have one end pivotally connected with respect to the deck as at 166 and their other ends pivotally connected to the panel 161 as at 167.

The power unit P' is mounted to the panel 161 as described with respect to the embodiment of FIG. 1 and is connected to the actuators 164, 165 by suitable piping of the type previously described.

As the power unit P' is identical to the power unit P, it will not be further described.

To ready the equipment for operation, it is merely necessary to fill the reservoir casing 54 with hydraulic fluid. This is done by removing plug 99' in plate 77 and plug 70 in cover plate 79.

Since the port closed by plug 70 is aligned with the screw 108 of flow regulator valve 104, adjustment of the rate of flow may readily be accomplished through such port.

Periodically it may be desirable to change the hydraulic fluid with fresh fluid and to clean out any sediment which may have settled out and accumulated in the container. Similarly, it may be necessary to replace or repair individual components within the container. The construction herein described readily admits of removal of the fluid by removing drain plug 82 and easy access to the individual components within the casing is provided by merely removing plates 77 and 79. Furthermore, by reason of the fact that plate 77 is larger than the power unit P and located directly over the latter, the entire power unit itself may be installed and removed through the opening 61'.

As the casing 54 which carries the components of the power unit is supported from the panel B by means of the shock mounts 62, the transmittal of vibration or shock from the panel to the casing 54 will be substantially minimixed. The power unit is also further isolated from any vibration or shock that may be transmitted from the panel by reason of the flexible tubing 143, 144 which connects the fittings 141, 142 to the solenoid valve 112.

By reason of the fact that the baffle plate 101 is parallel to the hinge axes of the panels, when the latter are pivoted, the baffle plate will minimize back and forth movement of the oil contained in the reservoir. As a result, turbulence with resultant creation of foam and air bubbles which would enter the hydraulic lines will be minimized.

It is also to be noted that the filter 109 is on the high pressure side of the pump 88 and the strainer 97 is on the low pressure side of the pump. Although the strainer is capable of preventing the passage of foreign matter of size to injure the pump, it will pass particulate contamination that could adversely affect the flow control valve 104 and solenoid valve 112. By reason of the filter 109, the oil is effectively filtered ahead of the flow control valve 104 and solenoid valve 112 to prevent passage of harmful particles.

Although the filter 109 acts as a restrictor and tends to cause a pressure drop, since it is on the high pressure side of the pump, the pressure drop for example of 10 p.s.i. caused by the filter will have little effect on the output pressure which is in the order of 3,000 p.s.i. Where the filter is on the low pressure or suction side of the pump, a pressure drop of 10 p.s.i. would be an appreciable portion of the available suction pressure and hence cavitation would occur.

With the construction herein described, any leakage of components within the casing is contained within the latter and as long as the pump functions properly to provide the necessary fluid flow, the equipment is fully operative without possibility of damage to cargo.

In addition, the construction above described minimizes the amount of hydraulic tubing and fittings required, thereby considerably reducing sources of potential leakage.

In order that the hatch cover panel be capable of withstanding heavy loads such as occurs when cargo is placed on the closed hatch cover panels, either the top plate of the panel must be of considerable thickness or a plurality of relatively closely spaced structural beams extending the width of the panel must be positioned beneath the panel to support the latter.

Since weight is a critical factor in ship construction, it is desirable that the weight of each hatch cover panel be minimized. This is especially important since a ship may have 40 or 50 hatch covers and the accumulated weight of the panels would be considerable. Furthermore, the heavier the panels the greater the power that would be required to effect movement thereof. For this reason, in the preferred embodiment shown, components comprising the hatch cover panel and power unit are arranged to facilitate minimizing the weight of the hatch cover panel.

More specifically, the power unit is designed and arranged to allow minimum spacing of the structural beams extending the width of the panel, which minimizes the required thickness of the panel top plate.

Thus, the power unit P in the preferred embodiment shown is located with the axis of the motor 84 at right angles to the pivotal axis of the associated panel B and the power unit P is made so that its smallest dimension parallel to the plane of the panel is at right angles to the axis of the motor and less than the spacing between an adjacent pair of beams, for example, beams 52, 53 so that it may be accommodated in the manner previously described.

In the preferred embodiment shown, the selector valve 112 is mounted on the wall of the casing opposed to the wall on which the motor is mounted. Not only does this construction provide the desired elongated power unit, but it provides for direct return of the fluid from the selector valve into the casing on the side of the baffle opposed to the inlet to the pump, thereby permitting effectiveness of the baffle as previously described.

With the construction above described, since each hatch cover assembly has its own complete hydraulic system, it can be assembled under appropriate clean conditions, free of contamination. As the cover assembly is provided with a self-contained power unit that is substantially isolated from vibration or shock that may be imparted to the panels, there is resultant elimination of possible damage to the power unit. As each hatch cover assembly has its own power unit, all of the hatch cover assemblies may be simultaneously opened and closed with resultant time saving and furthermore, potential leakage problems have been substantially reduced due to the positioning of hydraulic components within the reservoir.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A cover assembly for a hatchway in the deck of a ship comprising a first member, a second member comprising a panel adapted to extend over said hatchway, said panel lying in substantially a horizontal plane when in closed position and in a substantially vertical plane when in open position, means pivotally mounting said panel for movement between such positions, hydraulic actuating means operatively connected to said first member and said panel to move the latter between said positions, a power source mounted on said panel to provide the fluid under pressure to said hydraulic actuating means, said power source comprising a plurality of elements including a pump, a motor driving said pump, a selector valve operatively connected between said pump and said hydraulic actuating means, and a fluid reservoir comprising a rigid casing having a removable top wall, said pump, said motor and said selector valve being directly secured to said casing, said pump being positioned in said casing and operatively connected to said motor, and means mounting said casing with respect to the undersurface of said panel to inhibit transmittal of vibration to said plurality of elements from said panel, said means comprising a vibration damper, said vibration damper mounting said casing beneath said panel, said top wall being spaced from the panel and having a filling port, a removable plug in said port, said panel having an opening aligned with the fluid reservoir to provide access thereto.

2. The combination set forth in claim 1 in which said panel opening is of dimension greater than that of the fluid reservoir to permit movement of the latter through said opening.

3. A cover assembly for a hatchway in the deck of a ship comprising a first member, a second member comprising a panel adapted to extend over said hatchway, said panel lying in substantially a horizontal plane when in closed position and in a substantially vertical plane when in open position, means pivotally mounting said panel for movement between such positions, hydraulic actuating means operatively connected to said first member and said panel to move the latter between said positions, a power source mounted on said panel to provide the fluid under pressure to said hydraulic actuating means, said power source comprising a plurality of elements including a pump, a motor driving said pump, a selector valve operatively connected between said pump and said hydraulic actuating means, and a fluid reservoir comprising a rigid casing, having a fluid return port, a constant flow valve assembly mounted within said casing and connecting said pump outlet to said selector valve, said pump, said motor and said selector valve being directly secured to said casing, said pump being positioned in said casing and operatively connected to said motor, said pump having an inlet positioned in said casing, means mounting said casing with respect to the undersurface of said panel to inhibit transmittal of vibration to said plurality of elements from said panel, said means comprising a vibration damper, and a baffle plate extending parallel to the pivotal axis of said panel across the interior of said casing between said fluid return port and said pump inlet.

4. The combination set forth in claim 3 in which said rigid reservoir casing has a removable top wall spaced from the panel and having a filling port, a removable plug in said port, said constant flow valve having an adjustment member aligned with said filling port.

5. A cover assembly for a hatchway in the deck of a ship comprising a first member, a second member comprising a panel adapted to extend over said hatchway, said panel lying in substantially a horizontal plane when in closed position and in a substantially vertical plane when in open position, means pivotally mounting said panel for movement between such positions, hydraulic actuating means operatively connected to said first member and said panel to move the latter between said positions, a power source mounted on said panel to provide the fluid under pressure to said hydraulic actuating means, said power source comprising a plurality of elements including a pump, a motor driving said pump, a selector valve operatively connected between said pump and said hydraulic actuating means, and a fluid reservoir comprising a rigid casing, said pump, said motor and said selector valve being directly secured to said casing, said pump being positioned in said casing and operatively connected to said motor, means mounting said casing with respect to the undersurface of said panel, said rigid reservoir casing having a removable top wall, said top wall having a filling port, a removable plug in said port, said panel having an opening aligned with the fluid reservoir to provide access thereto.

6. The combination set forth in claim 5 in which said panel has a plurality of spaced parallel supporting beams and a top plate supported by said beams, said beams extending at right angles to the pivotal axis of said panel, and said casing is positioned between an adjacent pair of said supporting beams, the axes of said motor and said pump are at right angles to the pivotal axis of said panel and the width of the power unit taken at right angles to the axis of the motor is less than its length.

7. The combination set forth in claim 5 in which said pump has a suction port and a discharge port, a strainer is connected to said suction port and a filter is connected to said discharge port, said strainer and said filter being positioned in said casing.

References Cited by the Examiner
UNITED STATES PATENTS

| | | | |
|---|---|---|---|
| Re. 24,238 | 11/1956 | Greer | 160—188 |
| 2,675,759 | 4/1954 | Yanger | 103—41 X |
| 2,756,563 | 7/1956 | Bohlman | 60—52 |
| 2,913,985 | 11/1959 | Harrison | 103—37 |
| 2,915,265 | 12/1959 | Tiger | 248—18 |
| 2,922,373 | 1/1960 | Pahl | 103—37 |
| 3,060,538 | 10/1962 | Simi | 248—358 X |
| 3,066,610 | 12/1962 | Swanson | 103—41 X |

HARRISON R. MOSELEY, *Primary Examiner.*

P. M. CAUN, *Assistant Examiner.*